United States Patent [19]

Kelly et al.

[11] Patent Number: 4,519,645
[45] Date of Patent: May 28, 1985

[54] VEHICLE ESCAPE HATCH AND VENTILATOR

[75] Inventors: Timothy A. Kelly; Rueben M. Turbyfill, both of Salem, Va.

[73] Assignee: Ventilator Associates, Salem, Va.

[21] Appl. No.: 518,960

[22] Filed: Aug. 1, 1983

[51] Int. Cl.³ .............................................. B60J 7/10
[52] U.S. Cl. ................................... 296/224; 292/241; 292/DIG. 5
[58] Field of Search .............. 296/223, 224, 218, 216; 49/365, 366; 292/241, 240, DIG. 5

[56] References Cited

U.S. PATENT DOCUMENTS 923,696  6/1909  Packer .................................. 292/241
4,021,073  5/1977  Manning ............................. 296/223

Primary Examiner—Robert R. Song
Attorney, Agent, or Firm—Wilmer Mechlin

[57] ABSTRACT

A combined escape hatch and ventilator for a vehicle roof having a frame bounding its opening in the roof, a cover hingedly connected to the frame and normally limited in opening movement as a ventilator relative to one or more sides of the frame for ventilating an interior of the vehicle, one of the hinge connections being separable and formed of interfittable parts fixed respectively to the frame and cover and releasably connected by a latch pivotally mounted on one of the parts, the latch having a cam engageable with a lug on the other part for normally clamping the parts together and in an emergency enabling the parts of the separable connection to be disengaged and the cover swing about the connection on the opposite side of the frame for converting the roof opening to a fully openable escape hatch.

6 Claims, 6 Drawing Figures

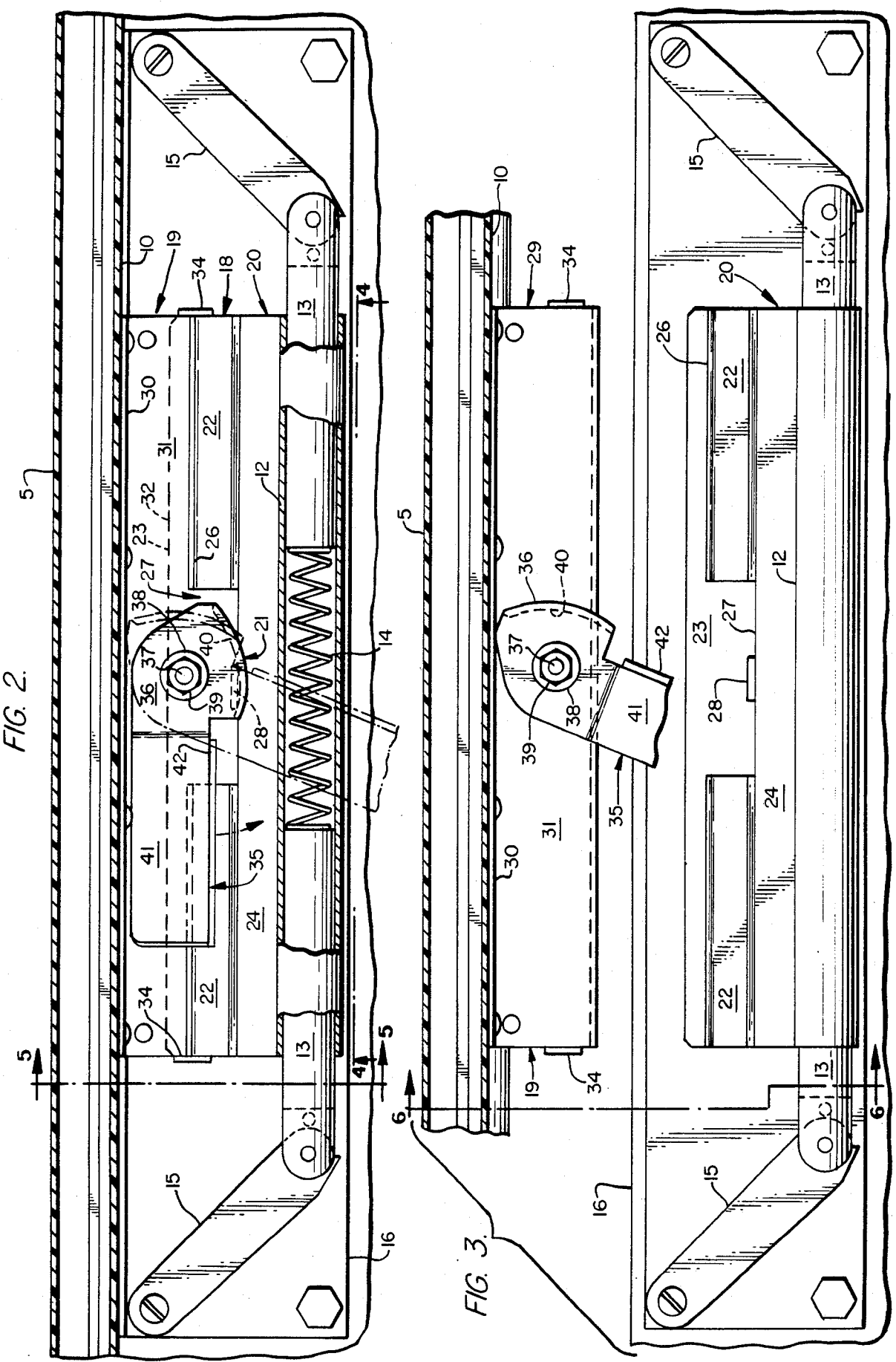

VEHICLE ESCAPE HATCH AND VENTILATOR

BACKGROUND OF THE INVENTION

As disclosed in Manning U.S. Pat. No. 4,021,073, it has heretofore been proposed to combine a ventilator and escape hatch for a roof of a bus or other vehicle by hingedly connecting a lid to opposite sides of a frame bounding an opening in a vehicle roof for a limited opening movement relative to one or more sides of the frame and forming at least one of the connections of separable parts, one connected to the lid and the other to the frame. In Manning the separable lid and frame parts are oppositely extending, normally overlapping web portions the outer end of each of which normally fits in a U-shaped section in the other part and the parts are normally connected by projections or spurs on a lever hinged to the lid part that are adapted to extend through then-aligned apertures in the web portions of both parts. A spring acting downwardly between the lid and the operating arm of the lever yieldably holds the projections in the aperture and withdrawal of the projections from the apertures by pressing the lever arm upwardly against the lid, enables the parts to be separated and the lid swung about the hinged connection at the opposite side of the frame for converting the roof opening into a fully openable escape hatch.

The principal concern in the present invention is an improvement on the combined vent and escape hatch of the Manning patent.

SUMMARY OF THE INVENTION

The primary object of the present invention is to provide an improved vehicle escape hatch and ventilator, whereof a cover is hingedly connected to opposite sides of a frame bounding an opening in a vehicle roof for limited opening movement relative to at least one side of the frame and the connection at that side is formed of interfittable parts fixed respectively to the frame and cover and releasably connected by a latch pivotally mounted on one of the parts and having a cam engageable with a lug on the other part for normally clamping the parts together, the latch on disengagement of its cam from the lug enabling the parts of the connection to be disengaged and the cover swung about the hinged connection on the other side of the frame for converting the roof opening to a fully openable escape hatch.

Another object of the invention is to provide an improved combined escape hatch and ventilator for a vehicle roof according to the preceding object wherein the interfittable parts are opposite facing channels each normally substantially fully and yieldably receiving a leg of the channel of the other part and adjoining legs of the channels are juxtaposed.

A further object of the invention is to provide an improved combined escape hatch and ventilator according to either of the preceding objects, wherein the cam on the latch is a wear-compensating curved wedge and the latch is pivotally mounted on the cover part and held without any spring in position to clamp the parts of the connection together by a predetermined frictional resistance to pivoting.

The foregoing and other objects and advantages of the invention will appear hereinafter in the detailed description, be particularly pointed out in the appended claims and be illustrated in the accompanying drawings, in which:

FIGURE DESCRIPTION

FIG. 2 is a fragmentary vertical sectional view on an enlarged scale, taken along lines 2—2 of FIG. 1, showing the parts of a separable hinge connection clamped together for operation as part of a ventilator;

FIG. 3 is a view of the same section and scale as FIG. 2 showing the parts of the separable hinged connection unclamped and separated for enabling the cover to be swung about the opposite side of the frame to fully open the roof opening as an escape hatch;

DETAILED DESCRIPTION

Figure 1:
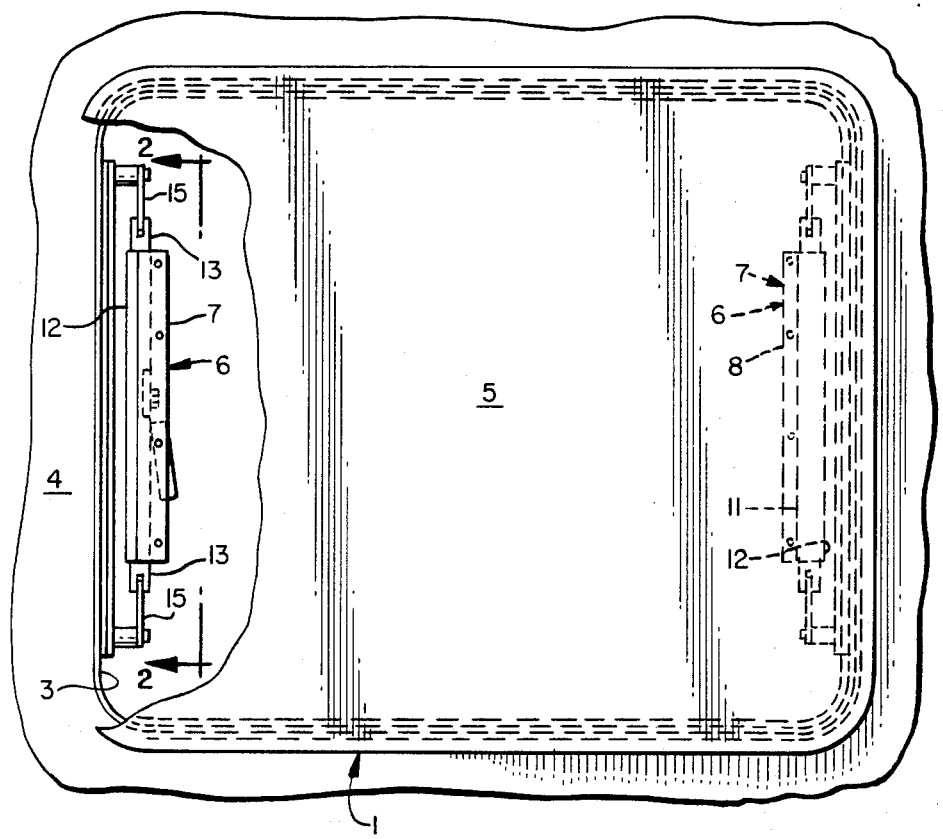
FIG. 1 is a plan view of a preferred embodiment of the vehicle roof escape hatch and ventilator of the present invention, with portions broken away to more clearly illustrate certain of the details of the construction.
Figure 4:
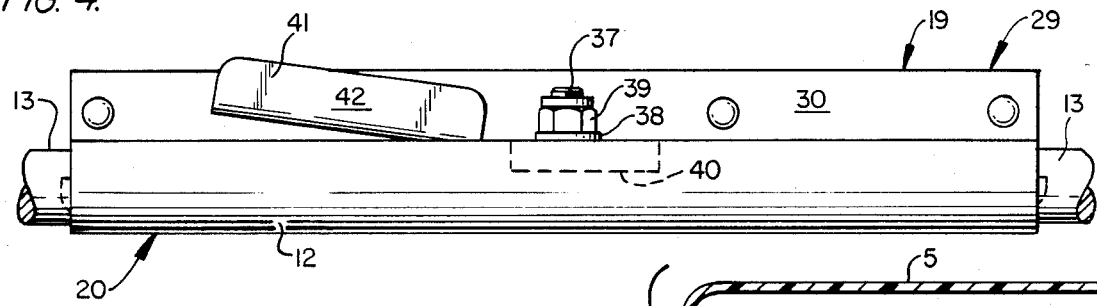
FIG. 4 is a fragmentary horizontal sectional view taken along lines 4—4 of FIG. 2.
Figure 5:
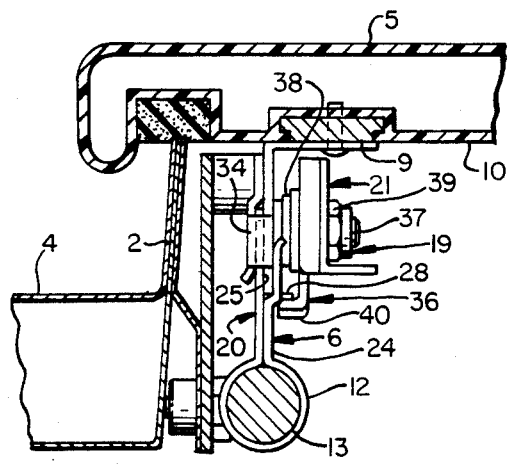
FIG. 5 is a fragmentary vertical sectional view taken along lines 5—5 of FIG. 2.
Figure 6:
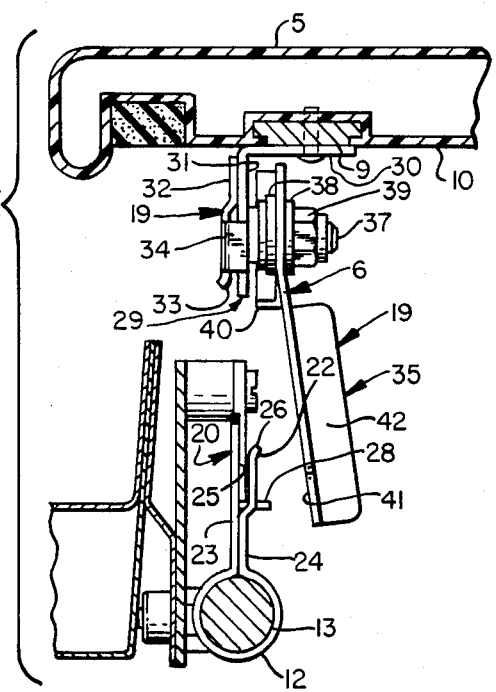
FIG. 6 is a fragmentary vertical sectional view taken along lines 6—6 of FIG. 3.

Referring now in detail to the drawings in which like reference characters designate like parts, the improved combined escape hatch and ventilator or escape hatch and ventilator assembly, designated as 1, is particularly designed for installation in a roof of a passenger-carrying vehicle, such as a bus, for serving both as a ventilator for ventilating the vehicle's interior and in emergencies as an escape hatch or exit when access to a conventional exit is partly or totally blocked.

The combined hatch and ventilator or hatch and ventilator assembly 1 is comprised of a frame 2 bounding a suitably rectangular opening 3 in a roof 4 of a vehicle (not otherwise shown). Most usually that of a bus, the roof 4 may be that of any vehicle compartment where both a ventilator and an emergency exit are of advantage. In the exemplary embodiment, the opening 3 is openable and closable by a cover, closure member, lid or door 5, which, as in the Manning patent previously referred to, is hingedly connected to opposite sides of the frame 2 by toggle linkages 6, each including a mounting bracket 7 having a base flange 8 riveted or otherwise suitably fixed or secured to a bar or plate-reinforced portion 9 of an inner panel 10 of the cover 5. The mounting bracket 7 has a web 11 integral with and instanding or downstanding substantially vertically from and normal to its base flange 8. An open-ended tube 12, horizontally disposed parallel to the cover's inner panel 10, forms the lower or inner end portion of the downstanding or depending web 11 and contains in and projecting from opposite ends a pair of plungers 13 and between the plungers a coil spring 14 acting on the plungers for yieldably urging them apart. Each of the plungers 13 has its outer end pivotally connected to one end of a link 15, the other end of which is pivotally mounted on a mounting plate 16 bolted or otherwise fixed or secured to the same side 17 of the frame 2.

Using hinged connections or linkages 6, such as above described, for connecting it to opposite sides 17 of the frame 2, the cover 5 would be capable of limited opening movement relative to the frame at either or both of the sides mounting the linkages, ordinarily the sides spaced longitudinally of the vehicle, and also of tilting laterally to open either of the lateral sides of the opening 3 and in any of these positions, and the pivots of the links 15 to the plungers 13 would be over-centered relative to the links' pivots to the mounting plates 16 for enabling the spring 14 to yieldably resist movement of the cover out of the position in which it had been set.

Resembling the combined vent and escape hatch of the Manning patent in connecting the cover 5 to the frame 2 by toggle-like linkages 6 and having as one of the linkages a separable linkage 18 formed of separable parts, one mounted on the cover and the other 20, on the frame, the hatch and vent assembly 1 of the present invention distinguishes over Manning's primarily in having a springless, wear-compensating latch-and-lug arrangement 21 for normally releasably clamping together the parts of the separable linkage.

Paired with an inseparable linkage 6, such as previously described, connecting the cover 5 to the opposite side 17 of the frame 2, the separable hinged connection or linkage 18 conveniently is stamped or otherwise formed mainly from sheet metal suitably of 14 gauge, as is the companion inseparable connection. As does the inseparable connection 6, the separable connection 18 of the illustrated embodiment also includes for connection to the adjoining side 17 of the frame 2, a tube 12 containing a pair of plungers 13 urged apart or outwardwardly by a common coil spring 14 and projecting from opposite ends of the tube, each for pivotal connection to one end of an adjoining link 15, the opposite end of which pivotally mounted on a mounting plate 16 bolted or otherwise suitably secured to the adjoining side 17 of the frame 2. However, in the separable connection 18, the tube 12, while still horizontally disposed substantially parallel to the inner panel 10 of the cover 5, is formed in and integral with one of the separable parts of the connection 18, here suitably the frame part 20.

Bent or folded back on itself for forming as a lower portion the tube 12, the frame part 20 has thereabove or beyond a pair of generally vertically directed or disposed inner and outer legs or flanges 22 and 23, respectively. Coextensive longitudinally with the tube 12, the legs 22 and 23, in a mid-portion or mid-section 24 of the part 20 adjoining the tube, abut, engage or are in surface contact with each other and are held or fixed in that relation suitably by being spot welded together at longitudinally spaced points. Both over and above and beyond the mid-section 24, the outer leg 23 preferably is flat, while the inner leg 22 above the mid-section is inwardly off-set to form with the outer leg a substantially parallel-sided upwardly opening groove or channel 25. Conveniently terminating upwardly short of the outer leg 23 in an inturned lip 26 for forming an upwardly flared entry to the groove 25, the inner leg 22 is interrupted centrally by a central slot or opening 27 in turn interrupted substantially centrally at the bottom by a suitably flat, instanding or inwardly projecting lug or catch 28 formed as an integral part of the inner leg and preferably coplanar at the top with the bottom of the slot-interrupted groove 25.

The other, here cover part 19 of the separable linkage 18, has as a mounting bracket an angle iron 29 having an upper or horizontal leg or flange 30 fixed, as by riveting to the reinforced portion 9 of the cover's inner panel 10 and a lower or depending leg or flange 31 downstanding substantially perpendicularly or normally from the inner panel. Desirably both flat and rectangular and coextensive longitudinally and aligned vertically and laterally of the cover 5 with the groove 25 in the lower part 20 in the normal or unseparated condition of the separable linkage 18, the flange 31 in that condition fits or seats in the groove 25 and engages and bears downwardly against the top of the lug 28. The interfit between the parts 19 and 20 in the unseparated condition of the linkage 18 is not limited to that between the lower flange 31 of the cover part 19 and the groove 25 of the frame part 20 but extends also to the outer leg 23 of the frame part by having fixed, as by spot welding, to the back of the lower flange a retainer plate 32 which forms with the flange a downwardly opening groove or channel 33 for seating, fitting or receiving the outer leg 23 of the frame part 20 in overlapping, juxtaposed or side-by-side relation with the lower flange 31 of the cover part not only on closing of the cover 5 but whenever the parts are interfitted or brought together. When interfitted, relative longitudinal movement of the parts 19 and 20 is prevented by tabs 34 on and bent inwardly of the ends of the retainer plate 32 for longitudinally containing or confining the outer leg 23 of the frame part 20 in the groove 33 in the cover part 19.

With the cover and frame parts 19 and 20 interfittable in the above manner and the lug 28 of the latch-and-lug arrangement 21 mounted on the frame part, the other or cooperating component of the arrangement, a latch 35, is mounted on the cover part. The latch 35 has a head 36 pivotally mounted on a stud 37 welded to and instanding or projecting inwardly from the central portion of the inside of the lower flange 31 of the mounting bracket 29 of the cover part 19. Normal or penpendicular to the inside of the flange 31, the stud 37 for the most part is smooth-shanked for receiving not only the latch's head 36 but also spacers or washers 38 for positioning the head axially of the stud. An elastic stop nut 39 threaded onto the outer end portion of the stud 37 not only holds the other elements on the stud but by predetermined tightening, allows the latch 35 to be pivoted or swung against frictional resistance about the stud when intentionally actuated, while preventing such pivoting under vibratory or shock forces to which the hatch and frame assembly 1 may be subjected in service.

When the cover and frame parts 19 and 20 are interfitted, the latch head 36 seats or is received in the slot 27 in the inner leg 22 of the frame part and is adapted to interlock or clamp together the parts by engaging the lug 29, or more precisely its underside, by a peripheral flange 40 on and outstanding or outwardly directed from a then lower edge of the head. Arcuately concave, the inner side of the flange 40 facing the stud 37 is eccentric relative thereto and conveniently may be swung as a circular arc about an axis offset upwardly from and to a side of the stud. In any case flange 40 acts or serves relative to the lug 28 as a cam or curved wedge movable, pivotable or swingable about the axis of the stud 37 for interlocking or clamping together the parts of the separable connection 18 except in an emergency calling for unlimited swinging of the cover 5 about one side of the frame 2 for fully opening the opening. Since, when the cover and frame parts 19 and 20 are interfitted, the bottom of the mounting bracket's lower flange 31 mounting the latch 35 engages the top of the lug 28, the lug in the locking position of the latch is clamped between the lower flange and the cam flange 40, thus inhibiting bending of the lug by unbacked forces.

In the lug-engaged position of the cam or wedge flange 40, shown in FIG. 2, a handle 41 of the latch 35 projects or extends substantially radially from the stud 37 and is bent inwardly beyond the head 36 to clear the adjoining portion of the inner leg 22 of the frame part 20 when swung clockwise to a position substantially parallel to the inner panel 10 of the cover 5 in the latch's locking position. Otherwise suitably flat, the handle 41 has along its then lower edge an instanding or inwardly directed edge flange 42, conveniently gripable when manually actuating the handle, clockwise to locking position and counterclockwise to releasing position. The handle 41 is useful not only in swinging the latch 35 between locking and releasing positions but in the latch's releasing position also serves as a convenient handle for pulling the cover part 19 down into reengagement or interfitting relation with the frame part 20 and, since the interlock between the parts is derived from engagement of the cam flange 40 with the lug 28, the interlock between the parts to a substantial degree is self-compensating for wear.

From the above detailed description it will be apparent that there has been provided a combined escape hatch and ventilator for a vehicle roof in which a cover 20 is hingedly connected to opposite sides of a frame bounding an opening in the roof and one of the connections is formed of normally interlocked parts separable for emergency use of the roof opening as an escape hatch, the parts being releasably interlockable by a latch-and-lock arrangement which is both springless and self-compensating for wear. It should be understood that the described and disclosed embodiment is merely exemplary of the invention and that all modifications are intended to be included that do not depart from the spirit of the invention and the scope of the appended claims.

Having now described our invention, we claim:

1. A combined escape hatch and ventilator for a vehicle roof, comprising a frame bounding an opening in the roof, a cover for opening and closing said opening, hinge means connecting said cover to opposite sides of said frame normally for limited opening movement relative to at least one of said sides, said hinge means at said one side being formed of separable interfittable cover and frame parts, lug means on one of said parts, latch means pivotally mounted on the other part, and cam means on said latch means and engageable with said lug means on interfitting of said parts for releasably interlocking said parts.

2. A combined escape hatch and ventilator for a vehicle roof, comprising a frame bounding an opening in said roof, a cover for opening and closing said opening, hinge means connecting said cover to opposite sides of said frame normally for limited opening movement relative to at least one side of said frame, said hinge means at said one side being separable into cover and frame parts, each of said parts having flange means projecting toward and interfittable with flange means on said other part, lug means on said flange means of one of said parts, latch means pivotally mounted on said flange means of the other part, and cam means on said latch means and engageable with said lug means on interfitting of said parts for releasably interlocking said parts.

3. A combined escape hatch and ventilator according to claim 2, wherein the lug means of the one part in the locking position of the latch means is clamped between the cam means on and flange mounting the latch means.

4. A combined escape hatch and ventilator for a vehicle roof, comprising a frame bounding an opening in said roof, a cover for opening and closing said opening, hinge means connecting said cover to opposite sides of said frame normally for limited opening movement relative to at least one of said sides, said hinge means at said one side being separable into cover and frame parts each having flange means normally overlapping and interfitting with flange means on the other part, lug means on and projecting inwardly from said flange means of said frame part, stud means mounted on and projecting inwardly from said flange means of said cover part, latch means pivotally mounted on said stud means, cam means on said latch means and cooperating in a locking position thereof with flange means mounting said stud means for releasably clamping said lug means between said can means and said flange means mounting said stud means, and means on said stud means for adjusting the frictional resistance to pivoting of the latch means and thereby inhibiting accidental pivoting of said latch means out of locking position.

5. A combined escape hatch and ventilator according to claim 3, wherein the latch means is springless and substantially self-compensating for wear in releasably interlocking the parts.

6. A combined escape hatch and ventilator according to claim 1, wherein the hinge means between the cover and frame connect the cover to opposite sides of the frame normally for limited opening movement relative to any one or more of said sides.

* * * * *